United States Patent [19]

Okuda

[11] Patent Number: 4,644,927
[45] Date of Patent: Feb. 24, 1987

[54] ENGINE IGNITION TIMING CONTROL DEVICE

[75] Inventor: Hiroshi Okuda, Himeji, Japan

[73] Assignee: Mitsubishi Denki Kabushiki Kaisha, Tokyo, Japan

[21] Appl. No.: 749,550

[22] Filed: Jun. 27, 1985

[30] Foreign Application Priority Data

Jun. 29, 1984 [JP] Japan .................. 59-135717

[51] Int. Cl.$^4$ .............................. F02P 3/06
[52] U.S. Cl. ..................... 123/602; 123/618
[58] Field of Search .............. 123/418, 422, 423, 427, 123/599, 600, 602, 605, 618, 643

[56] References Cited

U.S. PATENT DOCUMENTS 4,445,478 5/1984 Momoyama ............... 123/643 X
4,475,520 10/1984 Toyama et al. ............ 123/618
4,528,970 7/1985 Fujimoto ................. 123/618 X

FOREIGN PATENT DOCUMENTS 0022129 3/1975 Japan .
0067227 6/1975 Japan .
0072654 5/1980 Japan ..................... 123/602
0040027 9/1983 Japan .
0063368 4/1984 Japan ..................... 123/602

Primary Examiner—Willis R. Wolfe, Jr.
Attorney, Agent, or Firm—Oblon, Fisher, Spivak, McClelland & Maier

[57] ABSTRACT

Arithmetic operations of an ignition timing are carried out in an ignition timing operation circuit on the basis of an output signal from a signal generating means which generates signals for establishing the ignition timing to thereby obtain an advance angle characteristic in accordance with the number of revolution of the engine, and, at the same time, this increase or decrease in the number of revolution of the engine is converted to an increase or decrease in an electric potential, and then, by detecting a changing quantity per unit time of this electric potential and, when the changing quantity takes a value higher than a predetermined value, the ignition timing is further advanced or delayed to the ignition timing obtained from the result of the arithmetic operations in the abovementioned ignition timing operation circuit.

6 Claims, 7 Drawing Figures (54)

ENGINE IGNITION TIMING CONTROL DEVICE

BACKGROUND OF THE INVENTION

1. Field of the Invention

This invention relates to an outboard engine, etc., and, more particularly, it is concerned with an ignition timing control device for an outboard engine, etc., which performs an electrical control of the ignition timing of such outboard engine and which is excellent in its speed accelerating and reducing characteristics.

2. Description of the Prior Art

Outboard engines and the like are required to have good speed accelerating and reducing characteristics. To meet such demand it, has so far been a practice that an ignition signal generator is operated in association with opening of a throttle valve of the engine to thereby obtain a required ignition timing in connection with the throttle valve opening. In this type of the ignition timing control, however, as the mechanism for operating the ignition signal generator is complicated, there have been various disadvantages such that disorders often take place with the mechanism such as non-smooth operation of the mechanism, etc., on account of which periodical inspection and maintenance of the mechanism are needed.

Also, in order to remove the abovementioned disadvantages, there has also been adopted a system of electrically controlling the ignition timing. However, this system has not yet come to a point of enjoying its wide use because of poor response to the throttle operation, since an ordinary advance angle system is of a revolution detecting type where the advance or lag angle takes palce after the number of revolution of the engine begins to increase or decrease.

SUMMARY OF THE INVENTION

The present invention has been made with a view to removing the abovementioned disadvantages with the conventional ignition timing control devices, and aims at providing an improved engine ignition timing control device having good speed accelerating and reducing characteristics, and a simple construction, wherein arithmetic operations of an ignition timing are carried out in an ignition timing operation circuit on the basis of an output signal from a signal generating means which generates signals for establishing the ignition timing to thereby obtain an advance angle characteristic in accordance with the number of revolution of the engine, and, at the same time, this increase or decrease in the number of revolution of the engine is converted to an increase or decrease in an electric potential, and then, by detecting a changing quantity per unit time of this electric potential and, when the changing quantity takes a value higher than a predetermined value, the ignition timing is further advanced or delayed to the ignition timing obtained from the result of the arithmetic operations in the abovementioned ignition timing operation circuit.

According to the present invention, in general aspect of it, there is provided an engine ignition timing control device characterized in that it comprises a power source for ignition which generates an electric potential in accordance with revolution of an engine and supplies an electric power required for ignition of said engine; switching elements for supplying or interrupting electric power from said ignition power source to an ignition winding at a predetermined timing; signal generating means to generate a signal for establishing the ignition timing in accordance with revolution of said engine; an ignition timing operation circuit which operates the ignition timing on the basis of the signal from said signal generating means to output ignition signals to said switching elements and to simultaneously output pulse signals in accordance with the number of revolution of said engine; a frequency-voltage conversion circuit to output an electric potential in accordance with frequency of the pulse signals from said ignition timing operation circuit; and an electric potential changing quantity detecting circuit which detects a changing quantity per unit time of an output voltage from said frequency-voltage conversion circuit and generates an output signal when said changing quantity takes a value higher than a predetermined value, the ignition timing of said engine being determined, at the time of an abrupt speed acceleration or an abrupt speed reduction in said engine, in accordance with an output signal from said voltage changing quantity detection circuit.

BREIF DESCRIPTION OF DRAWINGS

The foregoing object, other objects as well as specific construction and functions of the engine ignition timing control device according to the present invention will become more apparent and understandable from the following detailed description thereof, when read in conjunction with the accompanying drawing illustrating preferred embodiments thereof.

DETAILED DESCRIPTION OF THE PREFERRED EMBODIMENTS

Figure 1:
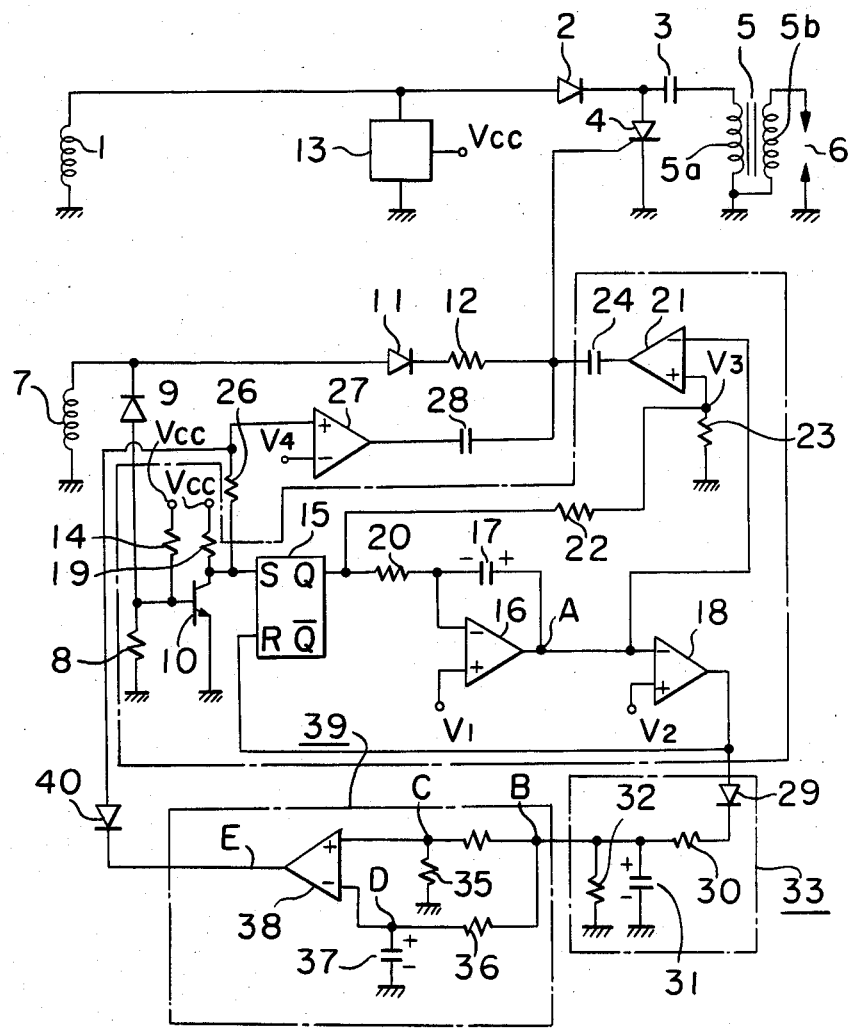
FIG. 1 is a circuit diagram of the engine ignition timing control device according to one preferred embodiment of the present invention.

In the following, the present invention will be described in detail with referecnce to one preferred embodiment thereof shown in FIGS. 1 to 4. FIG. 1 is a circuit diagram of the engine ignition timing control device according to one embodiment of the present invention, in which a reference numeral 1 designates a power generation winding of a generator (not shown in the drawing) which rotates in synchronism with an engine (also not shown in the drawing). The power generation winding 1 is provided as an ignition power source for the engine, and is so constructed that its output is rectified in a diode 2 to charge a capacitor 3, and, at the ignition timing of the engine, a signal enters into the gate of a thyristor 4 to thereby render it conductive, whereupon the electric charge in the capacitor 3 is discharged to a primary winding 5a of an ignition winding 5 and a high potential is generated in a secondary winding 5b thereof, which is then discharged to an ignition plug 6. A referece nemeral 7 designates a signal winding provided as a signal generating means, which generates both negative and positive signals at a certain definite angular interval in synchronism with revolution of the engine. The negative wave from this signal winding 7 flows through a resistor 8 and a diode 9, whereby a voltage drop occurred in the resistor 8 is supplied to the base of a transistor 10 as a reference signal for the arithmetic operations of the ignition timing.

On the other hand, the positive wave to be generated with a certain definite angular delay from the abovementioned negative wave is supplied to the gate of the thyristor 4 through a diode 11 and a resistor 12 to become the first ignition signal. A numeral 13 refers to a constant voltage power source circuit which produces a certain definite voltage by an output from the power generation winding 1 and supplies the power source voltage $V_{CC}$ to the circuit. An ignition timing operation circuit 25 is made up of resistors 8, 14 and 19; the transistor 10; a flip-flop (FF) 15 to be mentioned later; a resistor 20, a first operational amplifier 16; a capacitor 17; a second operational amplifier 18; resistors 22 and 23; a third operational amplifier 21; and a capacitor 24.

In the following, the operation of this circuit for the ignition control timing device will be described. As has been described above, the negative wave from the signal winding 7 is supplied to the transistor 10. At a stage prior to entrance of the signal, the transistor 10 takes supply of electric current from the power souce voltage $V_{CC}$ through the resistor 14 and it is in an "ON" state, while an S-terminal voltage of a flip-flop circuit 15 (hereinafter abbreviateed as "FF") is at a low level, hence its Q-terminal voltage is also at a low level. Since the output from the Q-terminal of the abovementioned FF 15 is applied to the negative (−) input terminal of the first operational amplifier 16, this operational amplifier outputs a high level signal, and the capacitor 17 interposed between the output terminal and the negative (−) input terminal of the operational amplifier 16 is charged in the polarities as shown in FIG. 1. On the other hand, the output from the operational amplifier 16 is applied to the negative (−) input terminal of the second operational amplifier 18. Since the output is a high level potential, a signal from the output terminal of the operational amplifier 18 is maintained at a low level. In this state, when the negative wave from the abovementioned signal winding is applied to the base of the transistor 10, it is brought to an "off" state for a time period corresponding to a signal width, the power source voltage $V_{CC}$ is applied to the S-terminal of FF 15 through the resistor 19, and the output from the Q-terminal of FF 15 is changed to a high level voltage to be applied to the negative (−) input terminal of the first operational amplifier 16. On account of this, the output from the operational amplifier 16 is changed to a low level voltage, whereby the capacitor 17 starts its discharge. The discharge from the capacitor 17 is effected under a certain definite time constant to be determined by its capacity, the resistor 20 forming the discharge circuit, and a value of a positive (+) terminal voltage $V_1$ of the first operational amplifier 16, whereby a voltage at the point A in FIG. 1 gradually decreases. As soon as the voltage value at the point A lowers to a certain definite value to be determined by the positive (+) terminal voltage of the operational amplifier 18, the output from the second operational amplifier 18 turns to a high level potential to be applied to the R-terminal of FF 15. Accordingly, the output from the Q-terminal of FF 15 becomes again a low level potential, hence the negative (−) input terminal of the operational amplifier 16 assumes a low level. In this manner, the output from the operational amplifier 16 assumes a high level potential, and the capacitor 17 begins to be charged at a certain definite time constant, whereby the voltage at the point A gradually increases. Subsequently, when the negative wave of the signal winding 7 is generated, the device repeats the same operations at every time the signal winding 7 generates the signal.

Figure 2:
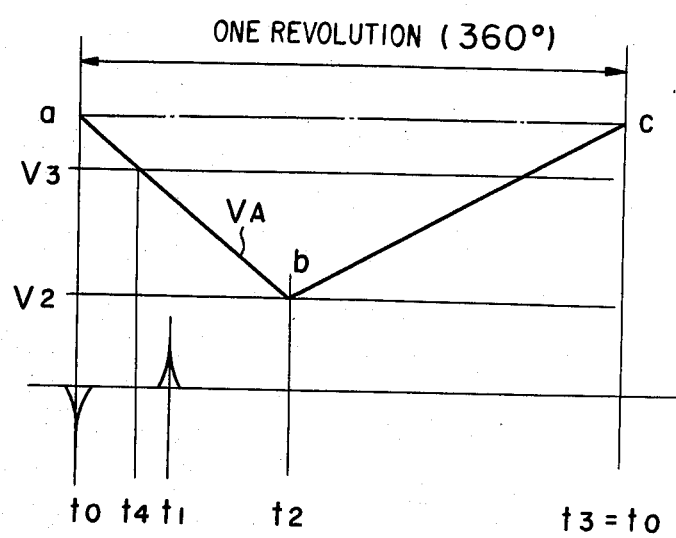
FIGS. 2 and 3 are respectively waveform diagrams for explaining the operations of the circuit shown in FIG. 1.

FIG. 2 is a diagram of the above-described operations, in which the operations at the point A in FIG. 1 are indicated. In the drawing the abscissa represents a rotational angle, and the ordinate represents a voltage. At a time instant $t_0$, the negative wave is applied from the signal winding 7 and the capacitor 17 discharges as mentioned in the foregoing, whereupon the voltage $V_A$ at the point A begins to decrease as shown in FIG. 2. When the voltage at the point A reaches, at a time instant $t_2$, a voltage value $V_2$, i.e., the positive (+) terminal voltage of the operational amplifier 18 in FIG. 1, the output from the operational amplifier 18 is reversed to be a high level potential to render the output from the Q-terminal of FF 15 to be a low level potential and the output from the operational amplifier 16 to be a high level potential, with the consequence that the capacitor 17 is re-charged, and the voltage at the point A increases as shown in FIG. 2 and receives again the negative wave from the signal winding 7 at a time instant $t_3 = t_0$ to start its discharge. Here, a locus triangle abc to be drawn by the charging and discharging as shown in FIG. 2 has an angular interval between 'a' and 'c' of 360°, and an angle at 'a' (corresponding to a discharge time constant) and an angle at 'b' (corresponding to a charging time constant) are determined by a circuit constant. From this, a similar triangle is drawn, and, irrespective of the rotational velocity, an angle between $t_0$ and $t_2$ is constant, thus indicating a constant angle oscillation.

Reverting to FIG. 1, a reference numeral 21 designates a third operational amplifier, the negative (−) input terminal of which takes the abovementioned voltage $V_A$ at the point A as the input into it, and the positive (+) input terminal of which takes a voltage $V_3$ resulted from division of the voltage at the Q-terminal of FF 15 by the resistors 22 and 23. At a time instant when the voltage at the negative (−) input terminal of the third operational amplifier 21 (i.e., the voltage at the point A) lowers to the voltage $V_3$ at the positive (+) input terminal of the operational amplifier 21, the output from the operational amplifier 21 turns to a high level potential, and a differential waveform is applied to the gate of the abovementioned thyristor 4 through a capacitor 24 to become the second ignition signal. A time instant $t_4$ in FIG. 2 constitutes an intersection between the voltage at the point A and the volage $V_3$, which is a generating point of the second ignition signal. Since the voltage $V_3$ is constant and, with increase in revolution, the time taken for one revolution becomes shorter, the charging voltage of the capacitor 17, i.e., the maximum value of the voltage at the point A, which repeats the charging and discharging at a definite time constant, becomes lowered, and the time instant $t_4$ which corresponds to the intersection between the voltage at the point A and the voltage $V_3$ comes closer to the time instant $t_0$ with increase in the revolution to finally reach the time instant $t_0$. Upon further increase in the revolution, the voltage at the point A cannot be higher than the voltage $V_3$, whereby the second ignition signal is fixed at a time instant when the positive (+) terminal voltage is applied to the operational amplifier 21, i.e., at the $t_0$ position. Accordingly, the second ignition signal has a characteristic such that it takes an advance angle up to a definite revolution to be determined by the values of $V_2$ and $V_3$, and is fixed at $t_0$ beyond the definite revolution.

On the other hand, the collector voltage of the transistor 10 is applied to the positive (+) input terminal of a fourth operational amplifier 27 through a resistor 26. To the negative (−) input terminal of the operational amplifier 27, there is applied a voltage $V_4$ which is an intermediate voltage between the collector voltage when the transistor 10 is in its "off" state and the collector voltage when the transistor is in its "on" state when the transistor 10 turns from its "on" state to its "off" state by application thereto of the negative wave from the signal winding 7, an high level potential is applied to the positive (+) input terminal of the operational amplifier 27, which becomes higher than the negative (−) terminal voltage, whereby the output from the operational amplifier 27 assumes a high level and is applied to the gate of the thyristor 4 throuqh a capacitor 28 to become a third ignition signal. The third ignition signal is generated at a time instant when the transistor 10 turns from its "on" state to its "off" state, i.e., at the time instant $t_0$ in FIG. 2, as mentioned in the foregoing. When the transistor 10 returns from its "off" state to its "on" state, the positive (+) terminal voltage of the operational amplifier 27 assumes a low level, hence the output from the operational amplifier 27 returns to a low level.

The third operational amplifier 18 generates a high level pulse output for a short period of time at every revolution. This can be seen clearly from FIG. 2. That is to say, when the negative (−) terminal voltage of the operational amplifier 18 (i.e., the voltage at the point A) becomes lower than the positive (+) terminal voltage (i.e., the voltage $V_2$), the output from the operational amplifier 18 turns to a high level potential, whereby the voltage at the point A increases as mentioned above. When the voltage at the point A increases, it becomes higher than the reference voltage $V_2$ of the operational amplifier 18, and the output from the operational amplifier 18 turns to a low level. In this manner, the operational amplifier 18 generates a definite high level pulse output to be determined by the power source voltage $V_{CC}$ at the time instant $t_2$ in FIG. 2. This high level pulse output is converted to a d.c. voltage proportionate to the number of revolution of the engine by means of a frequency-voltage conversion circuit (F-V conversion circuit) 33 composed of a diode 29, a resistor 30, a capacitor 31, and a resistor 32. An output voltage from the F-V conversion circuit 33 is introduced as an input into a voltage changing quantity detection circuit 39 composed of resistors 34, 35, 36, a Z0 capacitor 37, and a fifth operational amplifier 38. To the positive (+) input terminal of the fifth operational amplifier 38, there is applied a voltage obtained by dividing the output voltage from the F-V conversion circuit 33 through the resistors 34 and 35. On the other hand, the output voltage from the F-V conversion circuit 33 is applied to the negative (−) input terminal of the fifth operational amplifier 38 through the resistor 36. The capacitor 37 is connected between the negative (−) input terminal and the ground. So far as the number of revolutions of the engine is constant, the output voltage from the F-V conversion circuit 33 is constant, on account of which the terminal voltage of the capacitor 37 is equal to the output voltage of the F-V conversion circuit 33. Accordingly, the negative (−) terminal voltage of the operational amplifier 38 becomes higher than the positive (+) terminal voltage thereof, whereby the output from the operational amplifier 38 assumes a low level. The output terminal of the operational amplifier 38 is connected to the positive (+) input terminal of the fourth operational amplifier 27 through a diode 40. When the output voltage from the operational amplifier 38 is at a low level, the positive (+) terminal voltage of the operational amplifier (27) is also held at a low level through the diode 40. Accordingly, the output from the operational amplifier 27 maintains a low level.

Assume now that the number of revolution of the engine abruptly increases due to speed acceleration. The output voltage from the F-V conversion circuit 33 increases in proportion to the number of revolution of the engine, and the positive (+) terminal voltage of the operational amplifier 38 abruptly increases accordingly. However, since the capacitor 37 is connected to the negative (−) input terminal of the operational amplifier 38, the negative terminal voltage does not increase abruptly, but is gradually increases by charging of the capacitor 37 with the charging current flowing through the resistor 36. On account of this, the positive terminal voltage becomes higher than the negative terminal voltage, whereby the output from the operational amplifier 38 turns to a high level potential. The high level output signal from the operational amplifier 38 is prevented from its flowing out into the operational amplifier 27 by the diode 40. Accordingly, the operational amplifier 27 becomes responsive only to the collector voltage of the transistor 10 supplied thereto through the resistor 26, hence it supplies to the thyristor 4 the third ignition signal at the time instant $t_0$ in FIG. 2.

In the following, the operations of the voltage changing quantity detection circuit 39 will be explained in reference to FIG. 3, wherein the abscissa represents time, and reference letters B,C,D, and E respectively denote the voltages at the points B,C,D, and E in FIG. 1.

Figure 3:
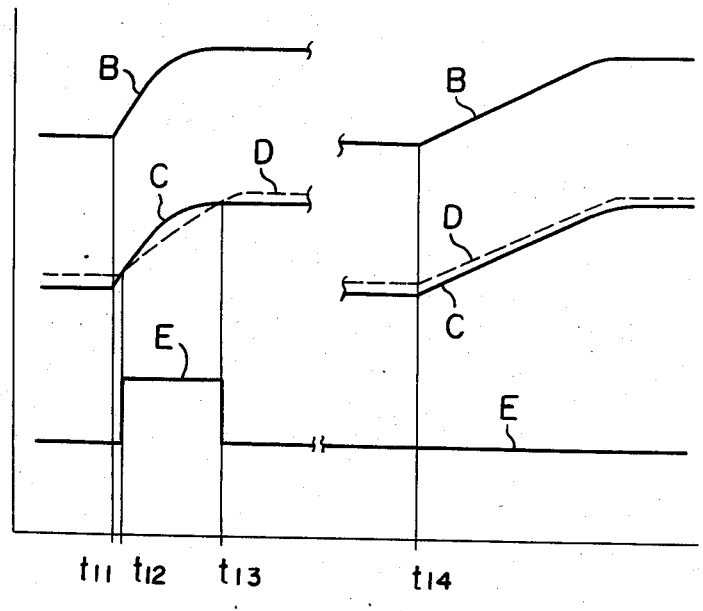

Now, when the number of revolution of the engine increases at a time instant $t_{11}$, the voltage at the point B increases as shown by B in FIG. 3 in accordance with the revolution, in response to which the voltage at the respective points C and D also increase as shown by C and D in FIG. 3. However, as mentioned above, the voltage at the point D delays its increase on account of the capacitor 37, whereby the magnitude of the voltage at the points C and D becomes inversed at a time instant $t_{12}$. and a high level output as shown by E in FIG. 3 is generated at the output terminal of the operational amplifier 38, i.e., at the point E. At a time instant $t_{13}$, when the magnitude of the voltage at the points C and D becomes inversed again, the voltage at the point E returns to a low level.

Next, the operations of the voltage changing quantity detection circuit 33 will be explained with reference to a case wherein the number of revolution of the engine increases gradually. At a time instant $t_{14}$, the number of revolution of the engine increases, hence the voltage at the point B increases; however, since the voltage increase is gradual, the voltage at the point D increases without bringing about a large delay from the voltage at the point B, on account of which the magnitude of the voltage at the points C and D is not reversed, and the voltage at the point E remains in a low level. In this way, the voltage at the point E assumes a high level only at the time of abrupt speed acceleration.

Figure 4:
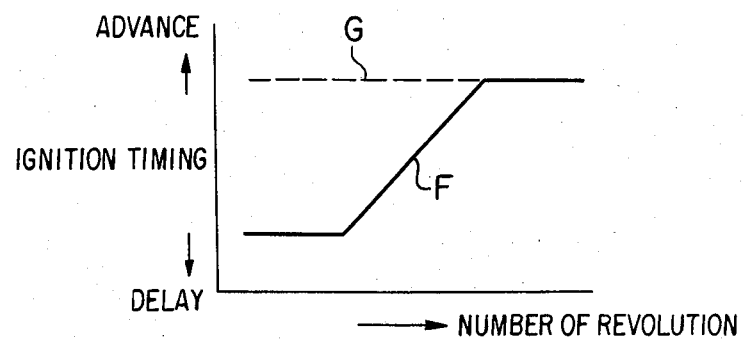
FIG. 4 is a characteristic diagram of an ignition timing according to the ignition timing control device shown in FIG. 1.

FIG. 4 shows the ignition timing characteristic of the engine ignition timing control device shown in FIG. 1. In the drawing, a reference letter F designates an ignition timing characteristic in a regular condition or in a gradual acceleration of the engine, while a reference letter G denotes an ignition timing characteristic at the time of abrupt speed acceleration.

As mentioned in the foregoing, when the number of revolution of the engine, in this embodiment, is in its normal state or in its gradual speed acceleration, the thyristor 4 is triggered with the first ignition signal from the signal winding 7 and the second ignition signal from the ignition timing operation circuit 25; however, when the engine is in its abrupt speed acceleration, the third ignition signal is supplied to the thyristor and the ignition spark is generated at a position of an advanced angle irrespective of the engine revolution with the consequence that the accelerating characteristic of the engine improves. In addition, the engine ignition timing control device according to the present invention does not require at all those mechanical structures or elements to be provided outside the device, such as an element for detecting the speed acceleration, e.g., a throttle position sensor for detecting a degree of opening of a throttle valve, and others, so that the control device has its various advantages such as high operating reliability, no necessity for maintenance, and so forth.

Figure 5:
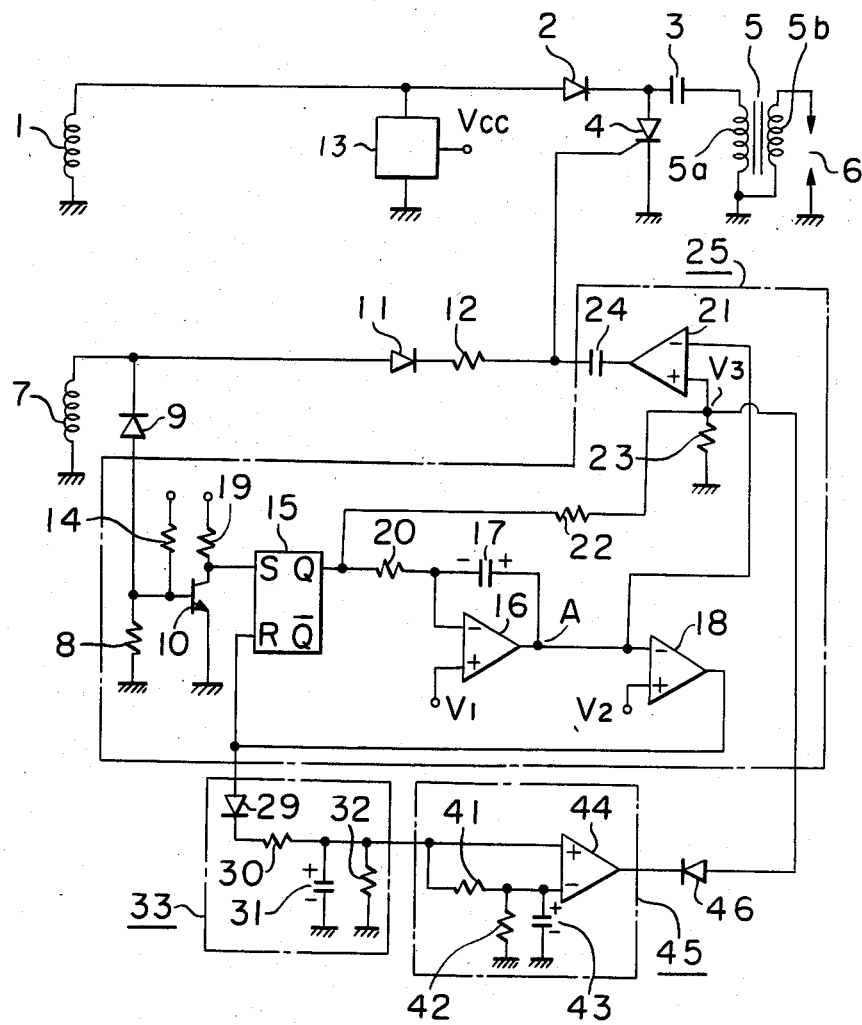
FIG. 5 is a circuit diagram of the engine ignition timing control device according to another preferred embodiment of the present invention.

The above-described embodiment of the present invention is directed to a case of taking an advance angle of the ignition timing at the abrupt speed acceleration. In the following, explanations will be given for another embodiment of the ignition timing control device according to the present invention, wherein the ignition timing is delayed at the time of abrupt speed reduction. FIG. 5 illustrates a circuit diagram for such embodiment, in which those parts designated by the same reference numerals as in FIG. 1 perform the same operations, hence their explanations will be dispensed with, and only those parts which are different from those in FIG. 1 will be explained.

In FIG. 5, the output voltage from the F-V conversion circuit 33 is input into the voltage changing quantity detection circuit 45 composed of resistors 41, 42, a capacitor 43, and an operational amplifier 44. To the positive (+) input terminal of the operational amplifier 44, there is applied the output voltage from the F-V conversion circuit 33, as it is sent out of it, while, a voltage divided by the resistors 41 and 42 is applied to the negative (−) input terminal of the operational amplifier 44, whereby the capacitor 43 is charged to the abovementioned divided voltage level. On account of such construction, when the output voltage of the F-V conversion circuit 33 is in its normal state, the magnitude of the positive (+) and negative (−) terminal voltages of the operational amplifier 44 is in a relationship of the positive terminal voltage being greater than the negative terminal voltage, hence the output from the operational amplifier 44 is at a high level. Since the high level output signal from the operational amplifier 44 is inhibited by a diode 46, there is no current flow, and the positive (+) terminal voltage of the operational amplifier 12 is maintained at the voltage $V_3$ to thereby output the second ignition signal as has been explained in detail for the ignition timing control device shown in FIG. 1. Next, when the number of revolution of the engine is reduced abruptly, the output voltage from the F-V conversion circuit 33 lowers rapidly in accordance with the number of revolution of the engine. However, since the capacitor 43 is connected to the negative (−) terminal of the operational amplifier 44, the terminal voltage does not lower abruptly, but gradually reduces by discharge through the resistors 41 and 42. On account of this, the magnitude of the positive and negative terminal voltages of the operational amplifier 44, at the time of the abrupt speed reduction, is in a relationship of the positive terminal voltage being smaller than the negative terminal voltage, and the output from the operational amplifier 44 turns to a low level. When the output from the operational amplifier 44 assumes a low level, the positive input terminal of the operational amplifier 21 which is groudned through the diode 46 also assume a low level with the result that the output from the operational amplifier 21 is brought to a state of its being at a low level with the result that it becomes unable to generate the second ignition signal and the engine becomes ignited with the first ignition signal of a delayed ignition timing. When the number of revolution of the engine gradually decrease, the terminal voltage of the capacitor 43 is also lowered without bringing about a considerable delay, so that the magnitude of the positive (+) and negative (−) terminal voltages of the operational amplifier 44 does not change, and the operational amplifier 44 continues to keep its high potential level.

Figure 6:
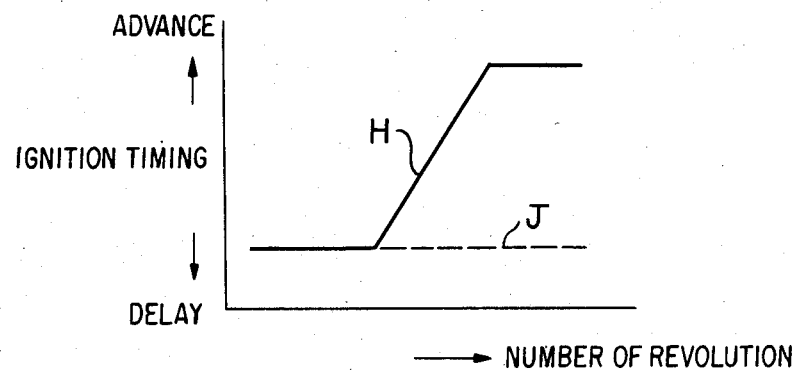
FIG. 6 is an ignition timing characteristic diagram of the control device shown in FIG. 5.

In the above-described embodiment, the second ignition signal is not generated at the time of the abrupt speed reduction, and the engine is ignited with the first ignition signal, i.e., at a delayed angle with the consequence that the number of revolution of the engine is quickly reduced and its speed reduction characteristic becomes favorable. FIG. 6 shows the ignition timing characteristics of the ignition timing control device according to the second embodiment of the present invention shown in FIG. 5.

In FIG. 6, a reference letter H designates the ignition timing characteristic when the engine is at its normal state or at the time of its gradual speed reduction, while the reference letter J denotes the ignition timing characteristic at the time of its abrupt speed reduction. In the following, as a further embodiment of the present invention, explanations will be made in reference to FIG. 7 as to a case of changing over the ignition timing by changing a reference voltage of the ignition timing operation circuit with an output from the voltage changing quantity detection circuit.

Figure 7:
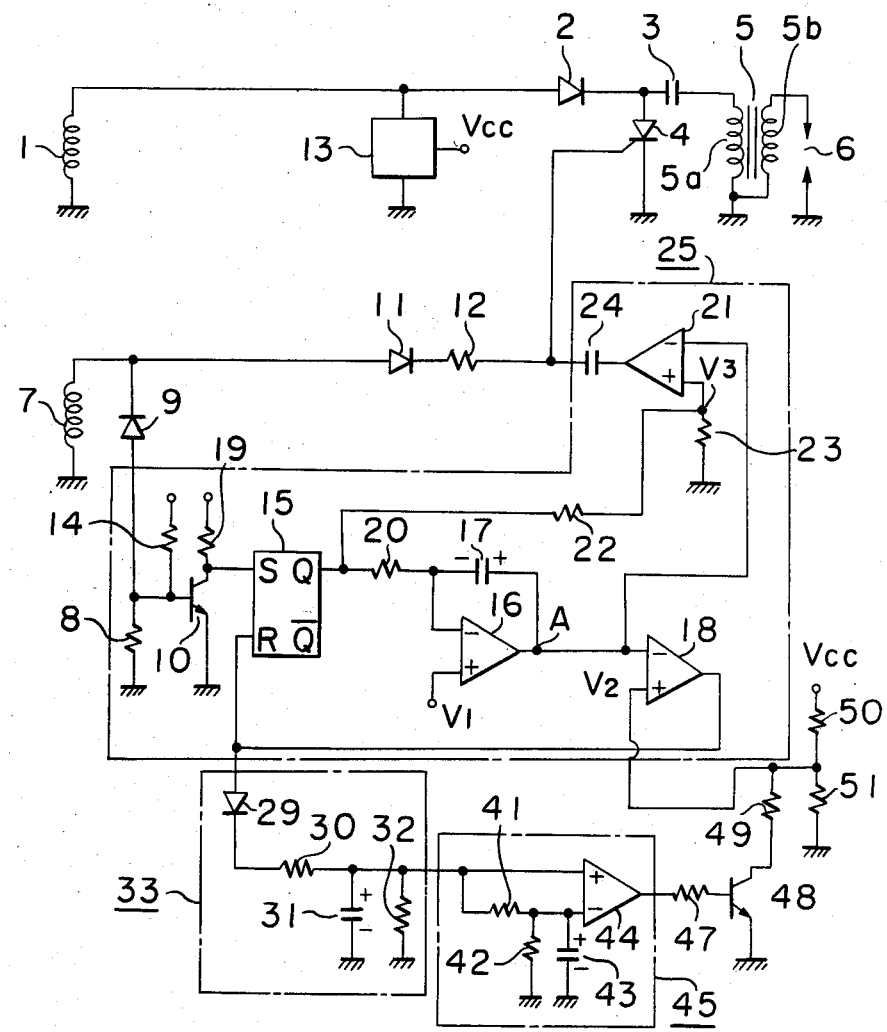
FIG. 7 is a circuit diagram of the ignition timing control device according to further embodiment of the present invention.

In FIG. 7, the operations of the voltage changing quantity detection circuit 45 is the same as has already been explained in detail with reference to the embodiment shown in FIG. 5, and the output voltage of the operational amplifier 44 at the time of the abrupt speed reduction assumes a low level. Accordingly, a transistor 48 which receives thereinto the output voltage of the operational amplifier 44 through a resistor 47 is turned off only at the time of the abrupt speed reduction. The positive (+) input terminal of the operational amplifier 18 is so made that a voltage divided by resistors 49 and 50 may be applied thereto; the voltage dividing ratio is different between "on" and "off" of the transistor 48, hence the voltage value $V_2$ becomes different. In the illustrated circuit construction, the positive (+) terminal voltage $V_2$ of the operational amplifier 18 becomes higher at the "off" state of the transistor 48 than at the "on" state thereof. As has already been explained in detail with reference to FIGS. 1 and 2, the positive terminal voltage $V_2$ of the operational amplifier 18 stands for the voltage at the vertex b in the triangle abc as shown in FIG. 2. The change in this voltage signifies that the triangle abc moves in the up and down direction. As it has already been explained that the second ignition signal is generated when the voltage in this triangle abc becomes lower than the voltage $V_3$, the displacement of the triangle abc in the up and down direction means that the generating position of the second ignition signal shifts.

In the embodiment shown in FIG. 7, when the transistor 48 is turned off at the time of the abrupt speed reduction, the positive terminal voltage $V_2$ of the operational amplifier 18 rises and the triangle abc in FIG. 2 moves in the upward direction, on account of which the intersection between the voltage $V_3$ and the time instant $t_4$ moves rightward and the ignition timing thus takes a delayed angle. As the consequenced of this, the abrupt speed reduction characteristic of the engine is improved as is the case with the embodiment shown in FIG. 5.

The above-explanations have been made with reference to a case where the engine revolution is delayed at its abrupt speed reduction. It should also be possible that the advance angle is taken at the time of abrupt speed acceleration by changing the reference voltage. For instance, the output terminal of the operational amplifier 38 shown in FIG. 1 assumes a high level only at the time of the abrupt speed acceleration. When this high level voltage is applied to the transistor 48 shown in FIG. 7, the transistor 48 is turned on only at the time of the abrupt speed accelaration, and the positive terminal voltage of the operational amplifier 18 becomes lowered accordingly, whereby the triangle abc in FIG. 2 moves in the downward direction. As the consequence of this, the intersection with the voltage $V_3$, i.e., the generating position of the second ignition signal moves in the leftward direction to take the advance angle. In the embodiment shown in FIG. 7, the voltage $V_2$ in FIG. 1 is made to be changed over. However, since the second ignition signal is generated when the voltage in the triangle abc becomes lower than the voltage $V_3$, the generating position of the ignition signal is also changed by varying the voltage value $V_3$. Furthermore, since the voltage $V_1$ constitutes an element for determining the magnitude of the triangle abc along with the resistor 20 and the capacitor 17, it is also possible to change over the generating position of the second ignition signal by varying the size of the triangle abc by changing over the voltage value $V_1$.

As has been mentioned in the foregoing, the ignition timing control device according to the present invention is so constructed that an ignition timing is operated in the ignition timing operating circuit on the basis of an output signal from the signal generating means which generates signals for establishing the ignition timing to thereby obtain an advance angle characteristic in accordance with the number of revolution of the engine, and, at the same time, the increase and decrease in the number of revolution of the engine is converted to the increase and decrease in the voltage, from which the changing quantity of the voltage per unit time is detected, and, when this chanigng quantity becomes higher than the predetermined value, a further advanced angle than the ignition timing resulted from the operations in the abovementioned ignition timing operating circuit is taken. With such circuit construction, there may be provided the engine ignition timing control device of good speed accelerating characteristic and speed reducing characteristic, and a simple construction.

So far the present invention has been described with reference to a few preferred embodiments thereof. It should, however, be noted that these embodiments are merely illustrative and not so restrictive, and that any changes and modifications in the circuit arrangement, etc. may be made by those persons skilled in the art without departing from the spirit and scope of the invention as recited in the appended claims.

What is claimed is:

1. An engine ignition timing control device, characterized in that it comprises:
    (a) a power source for ignition which generates an electric potential in accordance with revolution of an engine and supplies an electric power required for selectively ignition of said engine;
    (b) switching elements for supplying electric power from said ignition power source to an ignition winding at a predetermined timing;
    (c) signal generating means to generate a signal for establishing the ignition timing in accordance with revolution of said engine;
    (d) an ignition timing operation circuit which operates the ignition timing on the basis of the signal from said signal generating means to output ignition signals to said switching elements and to simultaneously output pulse signals in accordance with the number of revolution of said engine;
    (e) a frequency-voltage conversion circuit to output an electric potential in accordance with frequency of the pulse signals from said ignition timing operation circuit; and
    (f) an electric potential changing quantity detection circuit which detects a changing quantity per unit time of an output voltage from said frequency-voltage conversion circuit and generates an output signal when said changing quantity takes a value higher than a predetermined value, wherein the ignition timing of said engine being determined, at the time of an abrupt speed change in said engine, in accordance with an output signal from said voltage changing quantity detection circuit.

2. An engine ignition timing control device according to claim 1, wherein said signal generating means functions to generate both positive and negative signals, one of said positive and negative signals which is generated earlier being used as a reference signal for the operation.

3. An engine ignition timing control device according to claim 1, wherein said electric potential changing quantity detection circuit includes means for detecting voltage changes in the rising direction of the output voltage from said frequency-voltage conversion circuit, by which detection means, when the voltage changing quantity does not reach a predetermined value, an ignition signal generating position from said ignition timing operation circuit is made an ignition timing; and, when the voltage changing quantity exceeds the predetermined value, a generating position of a signal which constitutes a reference signal for the operation in said ignition timing operation circuit out of those outputs from said signal generating means is made the ignition timing.

4. An engine ignition timing control device according to claim 1, wherein said electric potential changing quantity detection circuit includes means for detecting voltage changes in the falling direction of the output voltage from said frequency-voltage conversion circuit, by which detection means, when the voltage changing quantity does not reach a predetermined value, an ignition signal generating position from said ignition timing operation circuit is made an ignition timing; and, when the voltage changing quantity exceed the predetermined value, a position of a signal which nullifies the ignition signal from said ignition timing operation circuit, and which is generated at a position delayed after the ignition signal generating position from said ignition timing operation circuit is made the ignition timing of the engine.

5. An engine ignition timing control device according to claim 1, wherein change-over means for changing over the ignition timing by changing a reference voltage of said ignition timing operation circuit with an output signal from said voltage changing quantity detection circuit is provided between said voltage changing quantity detection circuit and said ignition timing operation circuit.

6. An engine ignition timing control device according to claim 5, wherein said ignition timing operation circuit comprises a plurality of operational amplifiers for operating the ignition timing in accordance with the number of revolution of the engine, and any one of the reference voltages from these operational amplifiers is changed by an output signal from said voltage changing quantity detection circuit.

* * * * *